United States Patent
Izumi et al.

(10) Patent No.: US 8,007,672 B2
(45) Date of Patent: Aug. 30, 2011

(54) METHOD FOR DEMINERALIZING CONDENSATE

(75) Inventors: Takeshi Izumi, Yokohama (JP); Masahiro Hagiwara, Yokohama (JP)

(73) Assignee: Ebara Corporation, Tokyo (JP)

( * ) Notice: Subject to any disclaimer, the term of this patent is extended or adjusted under 35 U.S.C. 154(b) by 449 days.

(21) Appl. No.: 11/543,921

(22) Filed: Oct. 6, 2006

(65) Prior Publication Data

US 2007/0131619 A1 Jun. 14, 2007

(30) Foreign Application Priority Data

Oct. 6, 2005 (JP) ................................. 2005-293366

(51) Int. Cl.
 *C02F 1/42* (2006.01)
(52) U.S. Cl. ........................................ 210/675; 210/685
(58) Field of Classification Search .................. 210/675, 210/685, 687
 See application file for complete search history.

(56) References Cited

U.S. PATENT DOCUMENTS

| | | | | |
|---|---|---|---|---|
| 3,719,591 | A | * | 3/1973 | Crits ............................. 210/675 |
| 4,349,442 | A | * | 9/1982 | Barraque et al. .............. 210/675 |
| 4,457,841 | A | * | 7/1984 | Emmett ......................... 209/454 |
| 6,456,683 | B1 | | 9/2002 | Izumi et al. |

FOREIGN PATENT DOCUMENTS

| | | |
|---|---|---|
| JP | 55-028762 | 2/1980 |
| JP | 05-154474 | 6/1993 |
| JP | 9-248567 | 9/1997 |
| JP | 10-137751 | 5/1998 |
| JP | 11 352283 | 12/1999 |
| JP | 2000046992 A * | 2/2000 |
| JP | 2000-202440 | 7/2000 |
| JP | 2003-236540 | 8/2003 |
| JP | 2004-223513 | 8/2004 |

(Continued)

OTHER PUBLICATIONS

P. Chattopadhyay, Boiler Operation Engineering Questions and Answers, published Dec. 2000, McGraw-Hill, second edition, pp. 1225-1239.*

(Continued)

*Primary Examiner* — Matthew O Savage
(74) *Attorney, Agent, or Firm* — Oblon, Spivak, McClelland, Maier & Neustadt, L.L.P.

(57) ABSTRACT

The present invention provides a multiple bed-type condensate demineralization method and apparatus for the method that are able to provide an improved treated water quality in ammonia operation by substantially reducing the cross contamination ratio during resin regeneration from the current cross contamination ratio.

In the method of condensate demineralization using ion-exchange resin in a multiple-bed regime, condensate is passed through a resin layer having a multiple-bed structure in which an anion resin layer and a layer of a uniform particle size strong acid gel-type cation resin with a 10% to 16% degree of crosslinking, divided by a partition in such a manner that they do not mix with each other, are combined in alternation. The uniform particle size strong acid gel-type cation resin with a 10% to 16% degree of crosslinking is an ion-exchange resin that has a uniform particle size of 500 to 800 μm for which at least 95% of the resin particles fall in the range defined by the average particle size ±100 μm and the uniformity coefficient is less than or equal to 1.2. Ion-exchange resin that has come to require chemical regeneration is separately withdrawn and subjected to chemical regeneration by type and is returned into the originating partition.

5 Claims, 2 Drawing Sheets

FOREIGN PATENT DOCUMENTS

| JP | 2004-330154 | 11/2004 |
|----|-------------|---------|
| JP | 2005-296748 | 10/2005 |

OTHER PUBLICATIONS

Takeshi Izumi, et al.; "Performance of High Crosslinkage Gel Type Cation Exchange Resins for Condensate Polishers"; International Water Conference-98-47; pp. 1-5.

Toshi Takai, et al.; "Performance of High Crosslinkage Gel Type Cation Exchange Resins for Condensate Demineralizer (Part 2)"; International Water Conference-00-38; pp. 1-7.

Takeshi Izumi, et al.; "Development of 14% Crosslinked Strong Acid Cation Gel Resin"; International Water Conference-02-06; pp. 1-6.

* cited by examiner

METHOD FOR DEMINERALIZING CONDENSATE

BACKGROUND OF THE INVENTION

1. Field of the Invention

The present invention relates to condensate demineralization using ion-exchange resin in a multiple-bed regime and more particularly relates to a multiple bed-type condensate demineralization method and apparatus for the method that are used in steam power plants and that can reduce the frequency of chemical regeneration.

2. Description of the Related Art

The condensate demineralizer installed in the secondary system of a pressurized water reactor (PWR) plant carries out the demineralization of ionic impurities (e.g., Na, Cl, $SO_4$) in the condensate, thereby reducing the ionic impurities that will be carried into the steam generator through the feed water system to very low levels with the goal of stopping stress corrosion cracking, which is at risk of occurrence when the ionic impurities become concentrated, in the heat transfer pipework of the steam generator. In addition, in order to inhibit the inflow of crud (iron oxide) to the steam generator, an all volatile treatment (AVT) is carried out in the secondary system of PWR plants, in which, for example, ammonia and hydrazine are added to the condensate and the pH is controlled into the basic region.

Thus, in order to secure a very pure water quality, operations are carried out at the condensate demineralizer of PWR plants using a demineralizer having a mixed bed of H-form cation exchange resin and OH-form anion exchange resin (hereinbelow, simply referred to as an anion resin); however, the ammonia and hydrazine added to the condensate impose a large load on the cation exchange resin (hereinbelow, simply referred to as a cation resin) making it necessary to carry out chemical regeneration frequently due to the rapidity of ion breakthrough at the cation resin. This entails several problems for the PWR plant that must be addressed, such as economic problems such as an increase in the frequency at which the ion-exchange resin must be changed out, the consumption of large amounts of regenerant, pure water, steam, and air, and an increase in chemical waste solutions requiring treatment, as well as an increased burden on the operating personnel, the occurrence of oxidative deterioration of the cation resin during chemical regeneration, and a reduction in the reaction rate of the anion resin (hereinbelow, simply referred to as anion resin).

In addition, as the elapsed time in service by the ion-exchange resin grows, oxidative deterioration of the cation resin gradually progresses due to the frequent execution of chemical regeneration and the amount of eluted organic impurities undergoes a gradual increase. As a consequence, the sulfate ion produced by decomposition of the organics gradually undergoes an increase in concentration, while the surface of the anion resin is contaminated by the eluted organic impurities and the quality of the treated water declines due to a reduction in the reaction rate.

The ammonia operation of the condensate demineralizer, which enables a reduction in the frequency of chemical regeneration, can be considered as an approach that solves this problem, but the heretofore known ammonia operation provides a treated water quality inferior to that of H,OH operation and thus cannot be applied as such to PWR plants.

Methods that incorporate the use of an intermediate resin as in Japanese Patent Application Laid-open No. Hei 8-117615, the use of caustic soda for resin separation as in Japanese Patent Application Laid-open No. Sho 55-94650, and resin transfer as in Japanese Patent Application Laid-open No. Hei 4-100587 have been put forward as methods for reducing the cross contamination ratio; however, substantial reductions in the cross contamination ratio are a highly problematic proposition as long as the cation resin and anion resin are used in a mixed bed. In addition, Japanese Patent Application Laid-open No. Hei 11-352283 discloses a method that uses a highly crosslinked strong acid gel-type cation resin to halt the decline in water quality caused by the development of oxidative deterioration; however, when this is implemented in a mixed-bed regime, cross contamination occurs as cited above, making a reduction in water quality unavoidable.

SUMMARY OF THE INVENTION

Taking into consideration the circumstances described above, an object of the present invention is to provide a method and apparatus for condensate demineralization by a multiple-bed regime, wherein ammonia operation, which can reduce the frequency of chemical regeneration, is used for condensate demineralizer operation rather than H,OH operation and wherein, in order to inhibit a deterioration in water quality during this ammonia operation and thereby secure the same level of water quality as in H,OH operation, the treated water quality during ammonia operation is improved by substantially reducing the cross contamination ratio during resin regeneration from the current cross contamination ratio.

In order to achieve this object, the present invention provides a method of condensate demineralization that uses ion-exchange resin in a multiple-bed regime, wherein the condensate is passed through resin layers composed of a multiple bed comprising the alternating combination of an anion resin layer and a layer of a uniform particle size strong acid gel-type cation resin having a degree of crosslinking of 10% to 16% and preferably 12% to 15%, wherein the anion resin layer and the cation resin layer are divided by a partition in such a manner that they do not mix with each another.

The uniform particle size strong acid gel-type cation resin having a 10% to 16% degree of crosslinking that is used in this condensate demineralization method can be an ion-exchange resin that has a uniform particle size of 500 to 1000 μm, preferably 500 to 800 μm, and more preferably 550 to 700 μm, for which at least 95% of the resin particles fall in the range defined by the average particle size ±100 μm and the uniformity coefficient is less than or equal to 1.2. In addition, ion-exchange resin that has come to require chemical regeneration can be regenerated, without intermixing the anion resin with the cation resin, by separately withdrawing the resin from each individual partition-divided resin layer using water and air and subjecting the withdrawn cation resin and withdrawn anion resin each to separate chemical regeneration and washing, after which they are directly returned into their individual partitions by air and water.

In order during this chemical regeneration to completely remove the fractured resin and resin fines that have the potential to pass through the partition, excess cation resin is added to the withdrawn cation resin; the cation resin is scrubbed with air; overflow removal of the fractured resin and resin fines is thereafter carried out by backwashing at an expansion ratio of at least 100% for at least 30 minutes and fractured resin and resin fines that may be mixed at the top of the resin layer are withdrawn; and chemical regeneration is then carried out. In the case of the withdrawn anion resin, excess anion resin is added; air scrubbing is carried out; the fractured resin and resin fines are thereafter subjected to overflow removal by backwashing at an expansion ratio of at least 100% for at least 30 minutes; and, in order to avoid cross contamination of the fractured resin and resin fines that may be mixed in the lower part of the resin layer, chemical regeneration can be carried out on only the anion resin in the upper layer while introducing counterflow water from the lower part of the column. In addition, in order in this chemical regeneration to completely remove the partition-traversable fractured resin and resin fines, chemical regeneration can also be carried out after the removal from the withdrawn cation resin and anion resin of only the fractured resin and resin fines using a sieve.

In addition, with respect to a condensate demineralizer having a packing layer comprising ion-exchange resin packed in a multiple-bed regime, the condensate demineralizer according to the present invention is characterized in that the aforementioned packing layer comprises a multiple bed that is divided by a partition or partitions in such a manner that the layers do not mix with each another wherein the multiple bed combines an anion resin layer in alternation with a layer of uniform particle size strong acid gel-type cation resin having a 10% to 16% degree of crosslinking.

In this condensate demineralizer, a resin withdrawal conduit is connected to each individual packing layer, and each resin withdrawal conduit for each cation resin layer is connected to a cation resin regeneration column and each resin withdrawal conduit for each anion resin layer is connected to an anion resin regeneration column, thereby setting up a structure that enables the chemically regenerated resin to be returned to its corresponding resin layer or layers. A vibrating sieve apparatus having a mesh aperture that passes only the particular fractured resin and resin fines may be provided in each of these resin withdrawal conduits.

The following excellent effects can be expected from the present invention.

(1) The present invention, by going from the prior-art mixed-bed regime in the condensate demineralizer used in steam power plants to a multiple-bed regime comprising the combination, in correspondence to the quality of the water to be treated, of an anion resin monobed and a monobed of a highly crosslinked uniform particle size gel-type cation resin, secures a water quality equal to that of the mixed-bed regime. Moreover, the present invention, by combining pre-regeneration removal of the fractured resin and resin fines with withdrawal and regeneration of the anion resin separately from withdrawal and regeneration of the highly crosslinked uniform particle size gel-type cation resin, is able to substantially reduce the cross contamination ratio during resin regeneration from the current cross contamination ratio and is thereby able to prevent an impaired water quality during ammonia operation and to secure a water quality level equal to that afforded by H,OH operation.

(2) The present invention, by being a technology that substantially does not produce cross contamination, which is the biggest problem with mixed-bed condensate demineralizers, and by using a multiple bed composed of a stagewise combination of a plurality of resin layers, can secure a very pure water quality equal to that from mixed beds and is thereby able to raise the treated water quality from ammonia operation up to the same level as for operation with H,OH-form ion-exchange resins. The present invention is a groundbreaking technology that can address the problems associated with H,OH-form ion-exchange resin operation in contemporary condensate demineralizers in the secondary systems of PWRs, i.e., consumption of large amounts of regenerant, pure water air, and so forth, increased amounts of chemical waste solutions, and an increased burden on the operating personnel, and its economic effects are therefore quite substantial.

(3) The present invention, because it is a technology that substantially does not produce cross contamination, which is the biggest problem with mixed-bed condensate demineralizers, and because it can remove fractured resin and resin fines, is a technology that can also be widely applied to generating high purities for the reactor water for BWR plants, and its downstream benefits, such as application in the contemporary concept of plant life management, are quite substantial.

DESCRIPTION OF THE PREFERRED EMBODIMENTS

In order to prevent an impaired water quality during ammonia operation and secure a water quality level during ammonia operation that is the same as that during H,OH operation, the present invention provides an improved treated water quality during ammonia operation by substantially reducing the cross contamination ratio during resin regeneration from the current regeneration ratio.

In order to provide an improved treated water quality in an ammonia operation, it is necessary to lower the regenerant-induced cross contamination ratio (Na-form content, Cl-form content) by at least two orders of magnitude from the prior PWR level, thus reducing it to no more than 0.01%. Even when an ideal separation process is carried out with the resin separation technology of prior-art mixed-bed demineralizers, this is limited to an approximately one order of magnitude reduction in the current cross contamination ratio.

With regard to the demineralization column that treats condensate, the present inventors, as a result of diverse investigations, confirmed that a treated water quality equal to that from a mixed-bed demineralization column could be secured under PWR conditions by carrying out demineralization using a multiple-bed demineralization column comprising the combination, in a plurality of stages in correspondence to the quality of the water to be treated, of an anion resin monobed and a monobed of a uniform particle size gel-type cation resin having a 10% to 16% degree of crosslinking. A modality was then discovered that enables complete elimination of regenerant-induced cross contamination. This is achieved by a method in which the resin layers within the demineralization column are partitioned by, for example, a partition comprising a wedge wire screen installed on a perforated plate or a partition having a structure in which saran net or wire mesh is sandwiched by perforated plates, and in which, after water intake has finished, the ion-exchange resin in each layer is directly transported to a regeneration column for that particular type by a resin withdrawal conduit provided for the respective resin layer or layers and is therein subjected to chemical regeneration. This method enables the anion resin and the uniform particle size gel-type cation resin with a 10% to 16% degree of crosslinking, which differs from that in mixed-bed regimes, to be regenerated entirely without mixing and without carrying out a separation process. Furthermore, the discovery of countermeasures that prevent the admixture of fractured resin and resin fines into the individual resin layers made it possible to achieve a very pure resin regeneration in which the prior cross contamination ratio (Na cross contamination ratio: 0.05%, Cl cross contamination ratio: 1.0%) are substantially reduced, and it was thereby found that a very pure treated water could be secured even by ammonia operation. The details of the present invention are described in the following.

Figure 1:
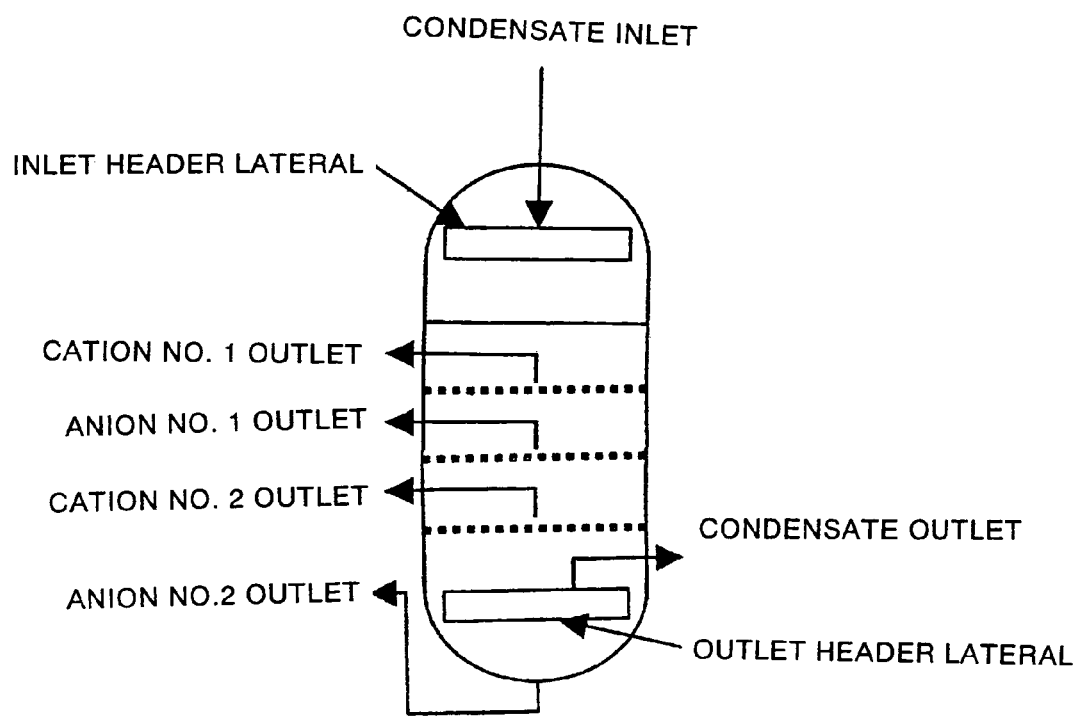
FIG. 1 is a schematic structural drawing of a multiple bed-type demineralization column used by the present invention.

The description will be provided using the example of a multiple-bed demineralizer comprising the following four beds in sequence from the uppermost resin layer: uniform particle size gel-type cation resin with a 10% to 16% degree of crosslinking, anion resin, uniform particle size gel-type cation resin with a 10% to 16% degree of crosslinking, anion resin. As shown in FIG. 1, the multiple-bed demineralizer comprises a multiple bed in which a 10% to 16% degree of crosslinking/uniform particle size gel-type cation layer No. 1 in a first chamber, anion layer No. 1 in a second chamber, 10% to 16% degree of crosslinking/uniform particle size gel-type cation layer No. 2 in a third chamber, and anion layer No. 2 in a fourth chamber are combined in an alternating regime. The demineralization treatment is carried out by passing the condensate through an inlet header lateral and then through the 10% to 16% degree of crosslinking/uniform particle size gel-type cation layer No. 1, anion layer No. 1, 10% to 16% degree of crosslinking/uniform particle size gel-type cation layer No. 2, and anion layer No. 2 in alternation, and after this demineralization treatment the condensate is collected by the outlet header lateral. Resin that has completed its water intake is withdrawn, through a resin withdrawal conduit provided at each resin layer, to a cation resin regeneration column or an anion regeneration column and is therein regenerated. Each chamber containing a resin layer is delimited by a partition comprising a wedge wire screen installed on a perforated plate, thus yielding a structure in which the individual layers of the ion-exchange resin do not mix. The layer heights of the individual resin layers are targeted to approximately 600 mm for the upper 10% to 16% degree of crosslinking/uniform particle size gel-type cation layer, approximately 300 mm for the upper anion layer, approximately 600 mm for the lower 10% to 16% degree of crosslinking/uniform particle size gel-type cation layer, and approximately 300 mm for the lower anion layer, wherein adjustment to the optimal layer height is carried out in view of the quality of the water to be treated.

The 10% to 16% degree of crosslinking/uniform particle size gel-type cation resin withdrawn from the demineralization column is directly transferred to a cation resin regeneration column.

Figure 2:
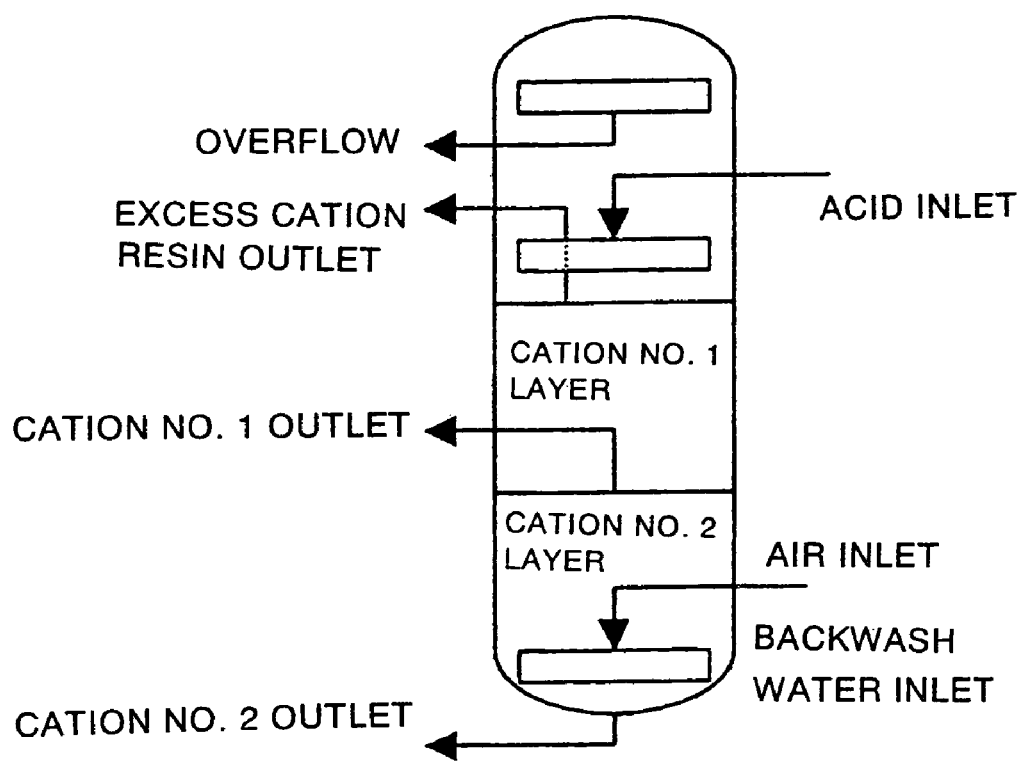
FIG. 2 is a schematic structural drawing of a cation resin regeneration column used by the present invention.

As shown in FIG. 2, the cation resin regeneration column comprises first and second chambers and interior conduits for simultaneously subjecting the 10% to 16% degree of crosslinking/uniform particle size gel-type cation resin No. 1 and 10% to 16% degree of crosslinking/uniform particle size gel-type cation resin No. 2 to backwashing and chemical regeneration without mixing with each other, and also comprises resin withdrawal conduits for the respective transfer of these resins to the demineralization column. Excess cation resin is added to the cation resin transported from the demineralization column and, after air scrubbing, backwashing is carried out at an expansion ratio of at least 100% for at least 30 minutes and the fractured resin and resin fines are subjected to overflow removal.

After the completion of backwashing, the upper layer of the cation resin is withdrawn to an excess cation resin tank in order to remove fractured resin and resin fines that may be admixed in the cation resin layer. After the chemical flowthrough, the resin is subjected to a thorough rinse and is then returned to the demineralization column in the sequence cation No. 1 and cation No. 2.

Just as for the cation resin, the anion resin No. 1 and anion resin No. 2 withdrawn from the demineralization column are also transported to an anion resin regeneration column in the sequence anion resin No. 1 and anion resin No. 2.

The anion resin regeneration column comprises first and second chambers and internal pipework for subjecting the anion resin No. 1 and anion resin No. 2 to backwashing and regeneration without mixing with each other, and resin withdrawal conduits for transferring the anion resin to the demineralization column and has about the same structure as the cation resin regeneration column.

Excess anion resin is added to the anion resin transferred from the demineralization column and, after air scrubbing, backwashing is carried out at an expansion ratio of at least 100% for at least 30 minutes and the fractured resin and resin fines are subjected to overflow removal. After the completion of backwashing, and in order to avoid cross contamination of fractured resin and resin fines that may be admixed at the bottom of the resin layer, chemical regeneration is carried out only on the upper layer anion resin while introducing counterflow water from the lower part of the column. After chemical flowthrough has been completed, the resin is subjected to a thorough rinse and is returned to the demineralization column in the sequence anion No. 1 and anion No. 2. The excess anion resin at the bottom permanently resides in the anion resin regeneration column and is sampled and analyzed according to an appropriate schedule; when the amount of admixed fractured resin and resin fines has undergone an increase, it is withdrawn through an excess anion resin outlet and exchanged for new resin.

In addition, in order to completely remove the fractured resin and resin fines capable of passing through the mesh aperture of the screen at a partition in the aforementioned multiple-bed demineralization column, a process may also be employed in which the cation resin and anion resin transferred from the demineralization column are each separately screened using, for example, a vibrating sieve apparatus that has a mesh aperture that passes only fractured resin and resin fines, and chemical regeneration is carried out after this removal of the fractured resin and resin fines.

The uniform particle size gel-type cation resin with a 10% to 16% degree of crosslinking used herein can be exemplified by Dowex MS650HXC(H) and MS575C(H) from the Dow Chemical Company; Amberjet1006 and Amberjet1024 from the Rohm and Haas Company; and DIAION UBK14T from the Mitsubishi Chemical Corporation. The anion resin is not particularly limited and, for example, the following may be used: Dowex MS550A(OH), SBR-P, SBR-C, SBR-P-C, MS-MP725A, and MSA-1-C from the Dow Chemical Company; IRA400, IRA900, and Amberjet9000 from the Rohm and Haas Company; and DIAION PA312 and SA10A from the Mitsubishi Chemical Corporation.

Example

The present invention is described in specific detail by the examples that follow.

Example 1

Water flowthrough testing, measurement of the conductivity of the treated water and ion concentrations in the treated water, and measurement of the breakthrough time were carried out on multiple beds prepared by combining the following ion-exchange resins (products of Dow Chemical Japan Ltd.) intended for application to the condensate demineralizer of a nuclear power plant: MS650HXC, a uniform particle size gel-type cation resin with a 14% degree of crosslinking, and MS550A, a strong base type 1 gel-type anion resin. Testing was carried out under the following conditions.

The cation resin and anion resin were packed at a 2/1 volumetric ratio in a column with an internal diameter of 30 mm. The resin layer height was 850 mm and the following packing regimes were employed.

case 1: 2 layers, cation resin (referred to as C below)/anion resin (referred to as A below) considered from the top
case 2: 3 layers, C/A/C considered from the top
case 3: 4 layers, C/A/C/A considered from the top
case 4: 5 layers, C/A/C/A/C considered from the top prior art: mixed bed The linear water flowthrough velocity was 80 m/h, which modeled actual equipment, while the temperature of the water receiving treatment was 35° C. and the water quality parameters at the inlet were as follows.

3.2 mg/L as $NH_4$
0.2 mg/L as $N_2H_4$
4.0 mg/L as NaCl
0.5 mg/L as $Na_2SO_4$

The results of the conductivity and ion concentration measurements are shown in Table 1. As may be understood from Table 1, in no case was a difference in treated water quality observed with respect to the prior art.

TABLE 1

|  | conductivity (mS/m) | Na (μg/L) | $NH_4$ (μg/L) | $N_2H_4$ (μg/L) | Cl (μg/L) | $SO_4$ (μg/L) |
|---|---|---|---|---|---|---|
| case 1 | 0.0055 | <0.01 | <0.01 | <0.01 | <0.01 | <0.01 |
| case 2 | 0.0055 | <0.01 | <0.01 | <0.01 | <0.01 | <0.01 |
| case 3 | 0.0055 | <0.01 | <0.01 | <0.01 | <0.01 | <0.01 |
| case 4 | 0.0055 | <0.01 | <0.01 | <0.01 | <0.01 | <0.01 |
| prior art | 0.0055 | <0.01 | <0.01 | <0.01 | <0.01 | <0.01 |

The breakthrough time ratio for each individual case is shown in Table 2 using the breakthrough time of the mixed-bed resin (prior art) as 1. As may be understood from Table 2, the breakthrough time was significantly shorter for case 1 (2 layer: cation resin/anion resin), but in the other cases was about the same as the prior art and thus can be said to be unproblematic from the standpoint of application to an actual apparatus.

TABLE 2

|  | relative breakthrough time |
|---|---|
| case 1 | 0.85 |
| case 2 | 0.95 |
| case 3 | 0.95 |
| case 4 | 0.95 |
| prior art | 1.00 |

Example 2

The removal behavior of fractured resin by backwashing was examined using the following ion-exchange resins (products of Dow Chemical Japan Ltd.) intended for application to the condensate demineralizer of a nuclear power plant: MS650HXC, a uniform particle size gel-type cation resin with a 14% degree of crosslinking, and MS550A, a strong base type 1 gel-type anion resin. Testing was carried out under the following conditions.

500 mL resin was placed in a 1-L beaker; 500 mL pure water was added; and stirring was carried out for 30 minutes with a magnetic stirrer. The resin was then packed in a column with an internal diameter of 30 mm and the amount of resin fines present in the backwash waste water was measured while adjusting the flow rate to give an expansion ratio of 100%. The test results are shown in Table 3. As may be understood from the table, the leakage of resin fines was observed when backwashing was first begun, but the leakage of resin fines then gradually declined with elapsed backwashing time and was almost completely absent after 30 minutes.

TABLE 3

|  |  | after 5 minutes (number/mL) | after 15 minutes (number/mL) | after 30 minutes (number/mL) |
|---|---|---|---|---|
| cation resin | greater than 25 μm | 20 | 1 | 0 |
|  | 1 to 25 μm | 400 | 20 | 0 |
| anion resin | greater than 25 μm | 50 | 4 | 0 |
|  | 1 to 25 μm | 850 | 50 | 1 |

Example 3

Water flowthrough testing was carried out on a 4-layer multiple bed comprising cation/anion/cation/anion resin layers considered from the top by combining the following ion-exchange resins (products of Dow Chemical Japan Ltd.) intended for application to the condensate demineralizer of a nuclear power plant: MS650HXC, a uniform particle size gel-type cation resin with a 14% degree of crosslinking, and MS550A, a strong base type 1 gel-type anion resin. The treated water was irradiated with ultraviolet radiation and the concentration of sulfate ion produced by decomposition was measured. The cross contamination ratio of the cation resin and anion resin was brought to 0.01%, which was the level of the new resin, because this was not produced at the multiple-bed demineralization column. In Comparative Example 1, a 4-layer multiple bed was used that combined MS650C, a particle size gel-type cation resin with a 10% degree of crosslinking, and the strong base type 1 gel-type anion resin MS550A. The cross contamination ratio of the cation resin and anion resin was brought to 0.01%, which was the level of the new resin, because this was not produced at the multiple-bed demineralization column. Comparative Example 2 used a mixed bed that combined MS650C, the particle size gel-type cation resin with a 10% degree of crosslinking, and the strong base type 1 gel-type anion resin MS550A; the cross contamination ratio was 0.1%, which is the usual level.

The tests were carried out under the following conditions.
The cation resin and anion resin were packed at a 2/1 volumetric ratio in a column with an internal diameter of 30 m. The resin layer height was 850 mm and a 4-layer C/A/C/A packing regime considered from the top was used for the multiple beds. A complete mixing regime was used for the mixed bed.

The linear water flowthrough velocity was 80 m/h, which modeled actual equipment, while the temperature of the water receiving treatment was 35° C. and the water quality parameters at the inlet were as follows.

3.2 mg/L as $NH_4$
0.2 mg/L as $N_2H_4$
4.0 mg/L as NaCl
0.5 mg/L as $Na_2SO_4$

The results of measurement of the conductivity and ion concentration are shown in Table 4. As Table 4 makes clear, the sulfate concentration was lower than in Comparative Example 1, which confirmed that the chemical stability had been improved by raising the degree of crosslinking of the uniform particle size cation resin from 10% to 14%. Moreover, the sodium concentration and chloride concentration were lower than in Comparative Example 2, which confirmed that hydrolytic leakage due to cross contamination had been kept down, yielding an excellent water quality. Based on the fact that the cross contamination-induced sodium concentration and chloride concentration were low, the frequency of chemical regeneration could be substantially reduced and the present invention performed well at a regeneration rate that was about one-eighth that in Comparative Example 2. Based on the results provided above, it can be said that the present invention is an excellent technology that provides a low frequency of chemical regeneration and that also provides lower sulfate, sodium, and chloride concentrations.

TABLE 4

| | sulfate ion concentration (µg/L) after ultraviolet irradiation |
|---|---|
| present invention | 0.003 |
| Comparative Example 1 | 0.010 |
| Comparative Example 2 | 0.010 |

| | sodium ion concentration (µg/L) |
|---|---|
| present invention | 0.002 |
| Comparative Example 1 | 0.002 |
| Comparative Example 2 | 0.005 |

| | chloride ion concentration (µg/L) |
|---|---|
| present invention | 0.005 |
| Comparative Example 1 | 0.005 |
| Comparative Example 2 | 0.020 |

| | frequency of chemical regeneration |
|---|---|
| present invention | every two months |
| Comparative Example 1 | every month |
| Comparative Example 2 | every 10 days |

INDUSTRIAL APPLICABILITY

The present invention is a technology that substantially does not produce cross contamination, which is the biggest problem with mixed-bed condensate demineralizers, and, through the use of a multiple bed structured by the stagewise combination of a plurality of resin layers, that can secure a high-purity water quality that is at least as good as that for a mixed bed. Moreover, the present invention can raise the water quality provided by ammonia operation to the same level as that provided by operation with H,OH-form ion-exchange resins. Since the present invention enables the removal of fractured resin and resin fines during regeneration, it is a technology that can also be broadly applied to generating high purities for the reactor water for BWR plants and that can additionally be applied in the contemporary concept of plant life management.

What is claimed is:

1. A method for demineralizing condensate, comprising:
    passing condensate through a demineralization column comprising a bed of multiple layers of ion-exchange resin, wherein the multiple layers of the bed of ion-exchange resin consists of an uppermost first cation resin layer positioned in a first chamber, a first anion resin layer positioned under the uppermost first cation resin layer in a second chamber, a second cation resin layer positioned under the first anion resin layer in a third chamber, and a second anion resin layer positioned under the second cation resin layer positioned in a fourth chamber, the demineralization column has a partition present between each of the chambers such that the resin layers do not mix with one another, and each of the uppermost first cation resin layer and second cation resin layer comprises a uniform particle size strong acid gel-type cation resin having a degree of crosslinking from 12% to 15%, an average particle size of from 500 to 800 µm and a uniformity coefficient of less than or equal to 1.2, and at least 95% of resin particles have a particle size within ±100 µm of the average particle size;
    transferring each of the cation resins from the first and second cation resin layers in the first and third chambers of the demineralization column separately using water and air to first and second chambers, respectively, of a cation resin regeneration column;
    transferring each of anion resins from the first and second anion resin layers in the second and fourth chambers of the demineralization column separately using water and air to first and second chambers, respectively, of an anion resin regeneration column;
    subjecting each of the cation resins of the first and second cation resin layers simultaneously to a chemical flowthrough regeneration and washing separately in first and second chambers, respectively, of said cation resin regeneration column such that the cation resin from the uppermost first cation resin layer and the cation resin from the second cation resin layer are regenerated without being mixed with each other; and
    subjecting each of the anion resins of the first and second anion resin layers simultaneously to a chemical flowthrough regeneration and washing separately in first and second chambers, respectively, of said anion regeneration column such that the anion resin from the first anion resin layer and the anion resin from the second anion resin layer are regenerated without being mixed with each other.

2. The method for demineralizing condensate according to claim 1, further comprising:
    transferring each of the cation resins from the first and second cation resin layers in the first and second chambers of the cation regeneration column separately using water and air to first and third chambers, respectively, of the demineralization column; and
    transferring each of the anion resins from the first and second anion resin layers in the first and second chambers of the anion regeneration column separately using water and air to second and fourth chambers, respectively, of the demineralization column.

3. The method for demineralizing condensate according to claim 2, wherein during said transferring, fractured resin and resin fines capable of passing through the partition are removed by separately screening each of the cation resins from the first and second cation layers and each of the anion resins from the first and second anion layers using a sieve.

4. The method for demineralizing condensate according to claim 1, further comprising:
    adding excess cation resin to the transferred cation resins and then air scrubbing the transferred cation resins for the chemical flowthrough regeneration in the cation regeneration column;
    carrying out overflow removal of fractured resin and resin fines capable of passing through the partition and being admixed at the top of the resin layers in the cation regeneration column, by backwashing the cation resins at an expansion ratio of at least 100% for at least 30 minutes, and thereafter carrying out the chemical flowthrough regeneration and washing such that admixture of the fractured resin and the resin fines in the cation resin layers is prevented; and transferring each of the cation resins from the first and second cation resin layers in the first and second chambers of the cation regeneration column separately using water and air to first and third chambers, respectively, of the demineralization column.

5. The method for demineralizing condensate according to claim 1, further comprising:

adding excess anion resin to the transferred anion resins and then air scrubbing the anion resins for the chemical flowthrough regeneration in the anion regeneration column;

carrying out overflow removal of fractured resin and resin fines capable of passing through the partition and being admixed at the top of the resin layers, by backwashing the anion resins in the anion regeneration column at an expansion ratio of at least 100% for at least 30 minutes, and thereafter carrying out the chemical flowthrough regeneration and washing of the anion resins such that admixture of the fractured resin and the resin fines in the anion resin lagers is prevented; and transferring each of the anion resins from the first and second anion resin layers in the first and second chambers of the anion regeneration column separately using water and air to second and fourth chambers, respectively, of the demineralization column.

\* \* \* \* \*